US007923124B2

(12) United States Patent
Minegishi et al.

(10) Patent No.: US 7,923,124 B2
(45) Date of Patent: Apr. 12, 2011

(54) LAMINATED STRUCTURE FOR A FLUID

(75) Inventors: Keiichi Minegishi, Saitama (JP); Yasunori Yoshida, Toride (JP); Kouji Wada, Kashiwa (JP); Youichi Kawamura, Tsukubamirai (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/211,462

(22) Filed: Sep. 16, 2008

(65) Prior Publication Data

US 2009/0098407 A1 Apr. 16, 2009

(30) Foreign Application Priority Data

Oct. 12, 2007 (JP) ................................ 2007-266452

(51) Int. Cl.
*B32B 7/02* (2006.01)
*B32B 15/20* (2006.01)

(52) U.S. Cl. ......... 428/596; 428/654; 428/686; 137/833

(58) Field of Classification Search ........................ None
See application file for complete search history.

(56) References Cited

U.S. PATENT DOCUMENTS

| | | | | |
|---|---|---|---|---|
| 3,495,604 A * | 2/1970 | Trask | ......................... | 137/15.01 |
| 3,534,755 A * | 10/1970 | Urbanosky | .................... | 137/816 |
| 3,952,576 A * | 4/1976 | Drzewiecki et al. | ......... | 73/54.01 |
| 4,549,574 A * | 10/1985 | Taylor | ...................... | 137/565.11 |
| 5,844,347 A * | 12/1998 | Takayama et al. | ........ | 310/313 R |
| 6,234,191 B1 * | 5/2001 | Clarke | .......................... | 137/347 |
| 2005/0162842 A1 * | 7/2005 | Muramatsu et al. | .......... | 361/818 |
| 2006/0016215 A1 * | 1/2006 | Tonkovich et al. | ............. | 62/617 |

FOREIGN PATENT DOCUMENTS

| | | |
|---|---|---|
| DE | 199 42 914 A1 | 3/2001 |
| GB | 1117185 | 6/1968 |
| JP | 6-218559 | 8/1994 |
| JP | 8-33990 | 2/1996 |
| JP | 2001-262331 | 9/2001 |
| JP | 2005-52885 | 3/2005 |

OTHER PUBLICATIONS

Merriman, A.D., A Dictionary of Metallurgy 1958, Published by Macdonald & Evans, p. 164.*

Kemppainen J., Stainless Steel—A New "Light Metal" for the Automotive Industry, Oct. 2000.*

N. Matsumoto, et al., "Electric-Joining of 5052 and 6063A1 Alloys", 2006 Japan Institute of Metals, Lecture Outline Series (139$^{th}$ Meeting), Sep. 16, 2006, 4 Pages (with Partial English Translation).

* cited by examiner

*Primary Examiner* — Jennifer C McNeil
*Assistant Examiner* — Adam C Krupicka
(74) *Attorney, Agent, or Firm* — Oblon, Spivak, McClelland, Maier & Neustadt, L.L.P.

(57) ABSTRACT

A laminated structure is formed by stacking a first block member, an intermediate member, and a second block member together in this order, and then mutually joining each of the members. Further, by setting the elastic constant of the intermediate member to be greater than the elastic constants of the first block member and the second block member, deformation of grooves, which are formed in the first block member, is minimized.

14 Claims, 7 Drawing Sheets

LAMINATED STRUCTURE FOR A FLUID

BACKGROUND OF THE INVENTION

1. Field of the Invention

The present invention relates to a laminated structure for a fluid, which is formed with fluid passages therein. More specifically, the present invention concerns a laminated structure for a fluid, in which an intermediate member is interposed between metallic block members to form fluid passages therein, wherein the elastic constant of the intermediate member is greater than that of the metallic block members, and further wherein the members are each joined together by diffusion bonding or welding.

2. Description of the Related Art

For the purpose of delivering a pressure fluid to a desired location and driving a fluid-operated device, a fluid passage is arranged between a pressure fluid supply source (e.g., a negative pressure supply source) and the fluid-operated device. These types of fluid passages are provided by drilling holes into metallic or resin blocks, and forming grooves therein by photoetching, or in certain cases, by pressing. In recent years, in accordance with space reduction and the arrangement conditions of various devices, structures have been adopted in which fluid passages are developed in three dimensions inside of a block body, and along with such requirements, a structure is adopted in which a plurality of blocks making up the block body are stacked or laminated on each other.

In this type of laminated structure for a fluid, various methods have been adopted for joining the plurality of blocks, which are stacked and laminated together.

For example, methods are known in which a powder of magnesium or the like is supplied to bonding surfaces of a plurality of aluminum alloy members, and diffusion bonding is carried out thereon (see, Japanese Laid-Open Patent Publication Nos. 2001-262331 and 08-033990, and N. Matsumoto et al., "Electric-Joining of 5052 and 6063A1 Alloys," 2006 Japan Institute of Metals, Lecture Outline Series (139th Meeting), Japan Institute of Metals, Sep. 16, 2006), and in which a plating layer is formed on the bonding surface of a joining base material that is diffusion bonded with another block member (see, Japanese Laid-Open Patent Publication No. 06-218559). Further, it is known to form a silver layer at the joining surface between an aluminum member and a copper member, for joining both of the members (see, Japanese Laid-Open Patent Publication No. 2005-052885).

However, with the technical concepts disclosed in the above references, when such members are joined with other members in a state in which fluid flow passages are formed therein, there are cases in which such flow passages become deformed by the other members. With such deformed flow passages, for example, fluid resistance is changed, and it becomes difficult to drive and control fluid pressure devices at a desired pressure (e.g., at a given vacuum or negative pressure). In addition, when the members are formed of synthetic resins, the strength thereof is inferior, and moreover, timewise changes over a period of years occur easily, together with the possibility that the functions thereof can vary, depending on environmental conditions.

SUMMARY OF THE INVENTION

The present invention has been devised taking into consideration the aforementioned problems, and has the object of providing a laminated structure for a fluid, in which block members are stacked, and in the case that fluid flow passages are formed in the interior thereof, deformation of such flow passages can be suppressed to a minimum. Further, the strength of the laminated structure is superior, durability is excellent, and a fluid pressure device can be driven or controlled in a desired condition.

The laminated structure for a fluid according to the present invention is characterized by a laminated structure in which two or more block members are stacked, wherein respective elastic constants of block members that are adjacent to each other are different.

The laminated structure for a fluid may include three block members (made up of a first block member, an intermediate member, and a second block member), wherein the first block member, the intermediate member and the second block member are stacked together in this order and are joined together mutually, and further wherein the elastic constant of the intermediate member is set to be greater than the elastic constants of the first block member and the second block member.

Preferably, the members are each joined by welding or by diffusion bonding. Further, when the first and second block members are made from a light metal or light metal alloy, and preferably from an aluminum-magnesium-silicon based alloy, and the intermediate member is made from a light metal or light metal alloy, and preferably from an aluminum-copper-magnesium based alloy, effects can be obtained in that the laminated structure is both lightweight and excellent in durability, and since the intermediate member is more superior in elasticity than the flow passages and the first and second block members, a greater strength can be maintained, while durability also is excellent.

In accordance with the laminated structure of the present invention, by laminating the first block member, the intermediate member, and the second block member in this order, while the elastic constant of the intermediate member is set to be greater than the elastic constants of the first block member and the second block member, deformation of flow passages that are formed in the first block member can be minimized, and a laminated structure for a fluid having high precision flow passages formed therein can be obtained.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
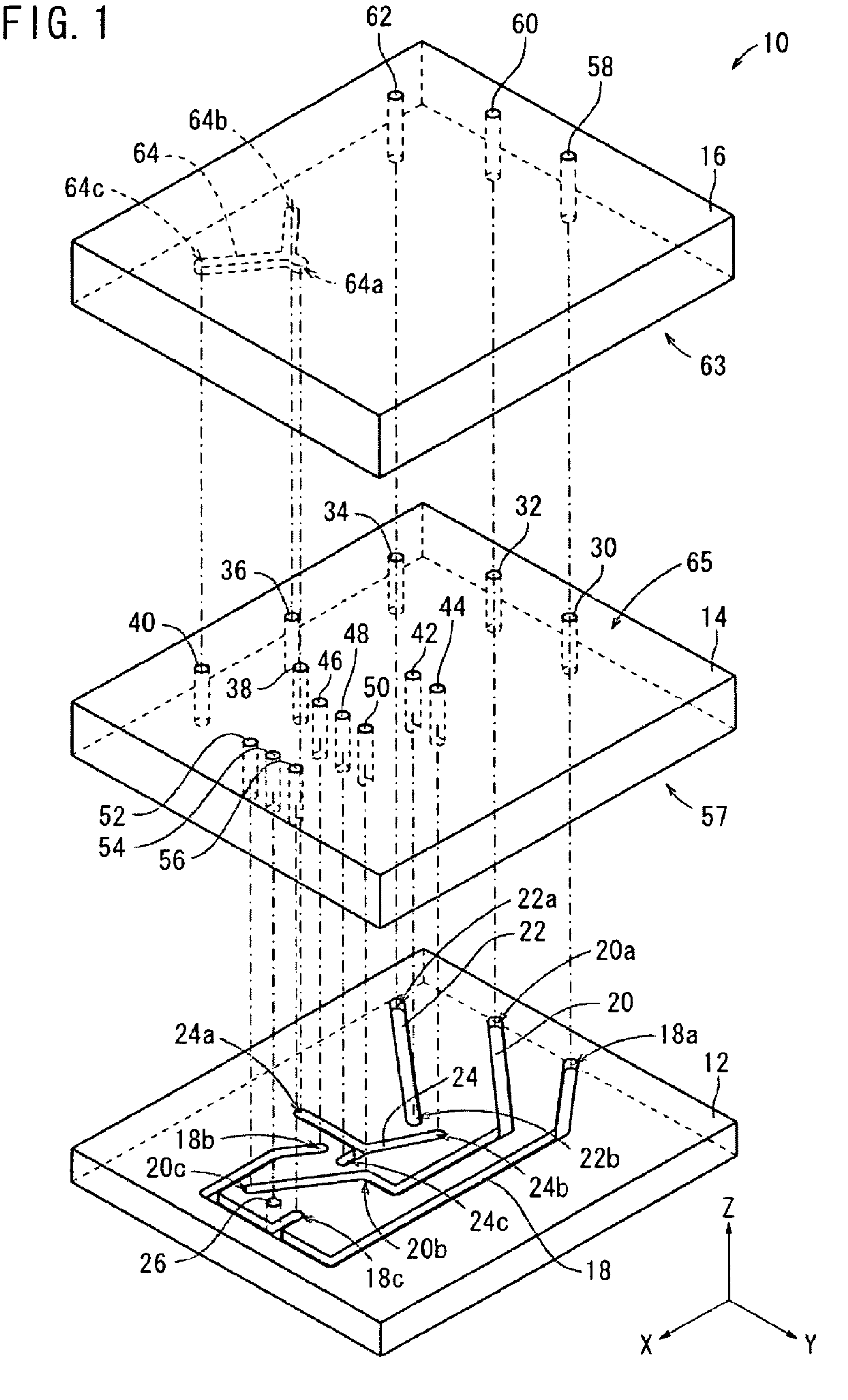
FIG. 1 is an exploded perspective view of a laminated structure for a fluid according to an embodiment of the present invention.
Figure 2:
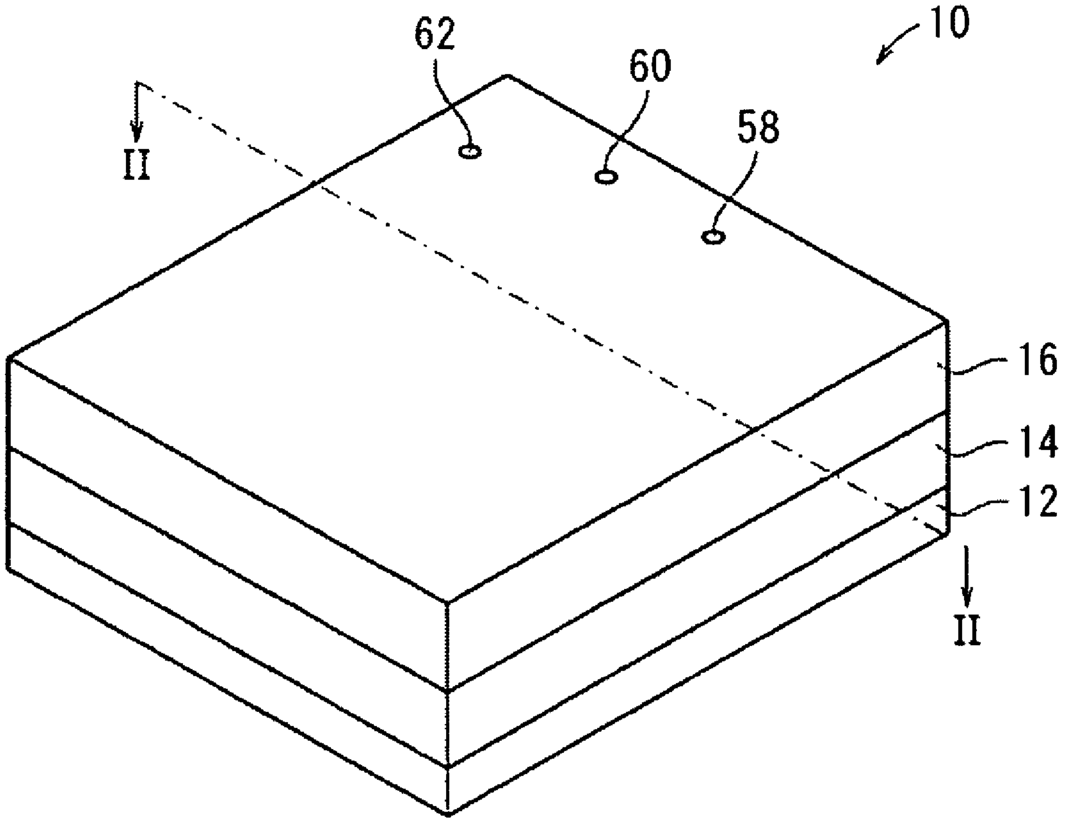
FIG. 2 is an outline perspective view of the laminated structure for a fluid according to the embodiment of the present invention.

Below, detailed explanations shall be given with reference to the drawings concerning an embodiment of the present invention. FIG. 1 is an exploded perspective view of a laminated structure 10 for a fluid, whereas FIG. 2 is an explanatory perspective view of the laminated structure 10 shown in FIG. 1.

As shown in FIG. 1, the laminated structure 10 for a fluid is made up from a first block member 12, an intermediate member 14, and a second block member 16. The first block member 12 is made of a metal plate, preferably, from aluminum or an aluminum alloy, and more preferably, from a 6000-series aluminum alloy according to the JIS standard. A JIS (Japan Industrial Standard) 6000-series aluminum alloy principally is made up of components of aluminum, magnesium and silicon. Grooves 18 to 24 and a discharge hole 26, through which a pressure fluid flows, are formed in the first block member 12.

The intermediate member 14 is made of a metal plate, preferably from an aluminum alloy, and more preferably, from a 2000-series aluminum alloy according to the JIS standard. A JIS standard 2000-series aluminum alloy principally is made up of components of aluminum, copper, and magnesium. Further, the elastic constant of the intermediate member 14 is greater than the elastic constant of the first block member 12, and more preferably, the longitudinal elastic constant and lateral elastic constant of the intermediate member 14 are both greater than the longitudinal and lateral elastic constants of the first block member 12.

The intermediate member 14 is formed with through holes therein. The through hole 30 communicates with the groove 18 at one end part 18*a* of the groove 18, the through hole 32 communicates with the groove 20 at one end part 20*a* of the groove 20, the through hole 34 communicates with the groove 22 at one end part 22*a* of the groove 22, and the through hole 38 communicates with a three-pronged groove 24 at one end part 24*a* thereof. Further, the through hole 42 communicates with the groove 22 at another end part 22*b* of the groove 22, whereas the through hole 44 communicates with the groove 24 at another end part 24*b* formed at one of the other ends of the groove 24. Furthermore, the through hole 46 communicates with the groove 18 at another end 18*b* of the groove 18, the through hole 48 communicates with the groove 24 at another end part 24*c* thereof, formed at another of the other ends of the groove 24, and the through hole 50 communicates with the groove 20 at a curved portion 20*b* thereof formed midway along the groove 20. Further, the through hole 52 communicates with the groove 20 at an end part 20*c* thereof at the other end of the groove 20, the through hole 54 communicates with the discharge hole 26, and the through hole 56 communicates with the groove 18 at an end part 18*c* of a groove portion, which branches at a midway location of the groove 18. Fluid flow passages are formed by the grooves 18, 20, 22, 24 of the first block member 12 and the lower surface 57 of the intermediate member 14.

The second block member 16 is made from the same material as the first block member 12. An inlet hole 58, an outlet hole 60, and an exhaust hole 62 are formed in the second block member 16. A three-pronged groove 64 through which the fluid passes is formed on a bottom surface part 63 of the second block member 16. The inlet hole 58 communicates with the groove 18 at an end part 18*a* thereof via the through hole 30, the outlet hole 60 communicates with the groove 20 at an end part 20*a* thereof via the through hole 32, and the exhaust hole 62 communicates with the groove 22 at an end part 22*a* thereof via the through hole 34. Further, an end part 64*a* at one end of the groove 64 communicates with the through hole 38, an end part 64*b* at another end of the groove 64 communicates with the through hole 36, and an end part 64*c* at the other end of the groove 64 communicates with the through hole 40. Thus, a fluid flow passage is formed by the upper surface 65 of the intermediate member 14 and the groove 64 of the second block member 16.

The laminated structure 10 for a fluid according to the embodiment of the present invention is constructed basically as described above. The first block member 12, the intermediate member 14, and the second block member 16 are stacked in this order (in the Z direction in FIG. 1) and are mutually joined together by diffusion bonding. Such diffusion bonding is carried out by applying a compressive force in the Z direction with respect to the laminated structure 10, while the laminated structure 10 is placed under a high temperature. The laminated structure 10 for a fluid, which is obtained by diffusion bonding the first block member 12, the intermediate member 14, and the second block member 16, is shown in FIG. 2.

Figure 3C:
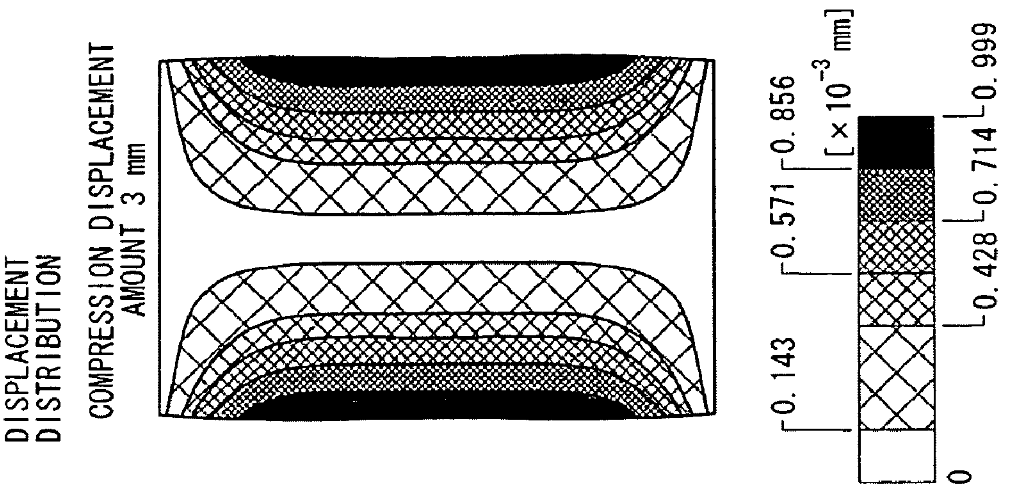
FIG. 3C is an explanatory diagram of the effect of a simulation indicating an X-direction displacement distribution, in a cross section of a plate of the same thickness as the laminated structure of the present invention, in which a compression displacement amount is 3 mm.
Figure 3B:
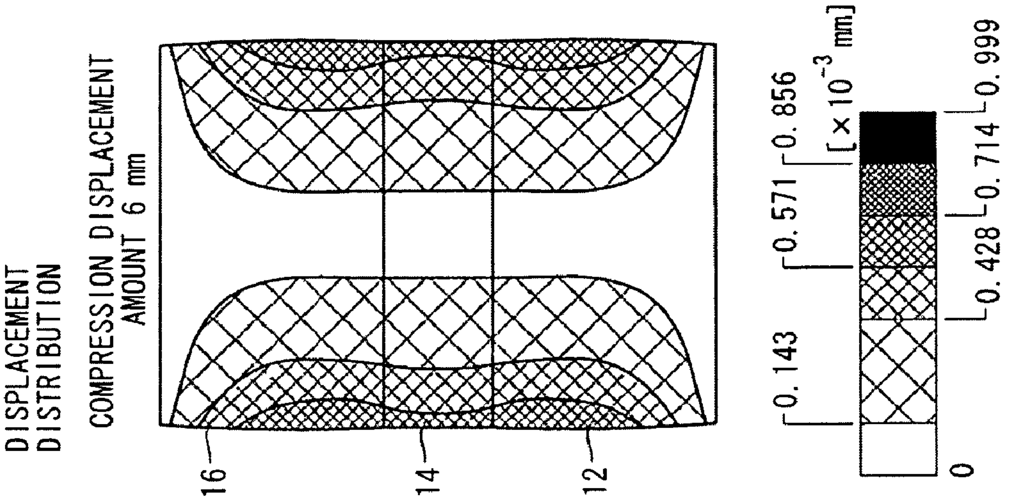
FIG. 3B is an explanatory diagram of the effect of a simulation indicating an X-direction displacement distribution, in a cross section taken along line II-II of FIG. 2, in which a compression displacement amount is 6 mm.
Figure 3A:
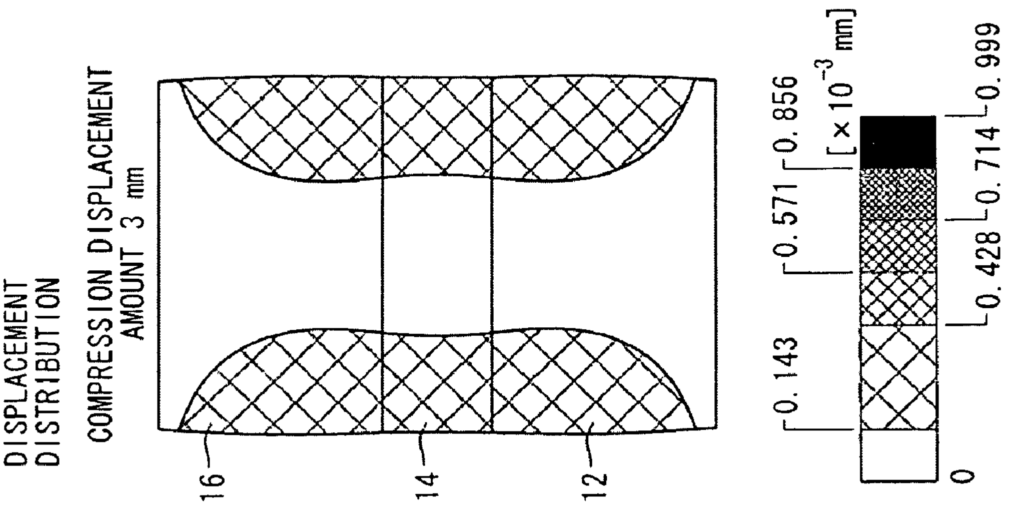
FIG. 3A is an explanatory diagram of the effect of a simulation indicating an X-direction displacement distribution, in a cross section taken along line II-II of FIG. 2, in which a compression displacement amount is 3 mm.

FIGS. 3A and 3B are explanatory diagrams of the effects of a simulation indicating an X-direction displacement distribution, in a cross section taken along line II-II of FIG. 2, for cases in which a compressive force is applied to the laminated structure 10 for a fluid, where FIG. 3A shows a case in which a Z-direction compression displacement amount is 3 mm, and FIG. 3B shows a case in which the Z-direction compression displacement amount is 6 mm. FIG. 3C is an explanatory diagram of the effects of a simulation indicating an X-direction displacement distribution, in a cross section taken along the Z-direction, for a case in which the compression displacement amount in the Z-direction is 3 mm, a plate has the same thickness as the laminated structure 10 and is formed by a JIS 6000-series alloy.

Figures 4A, 4B, 4C:
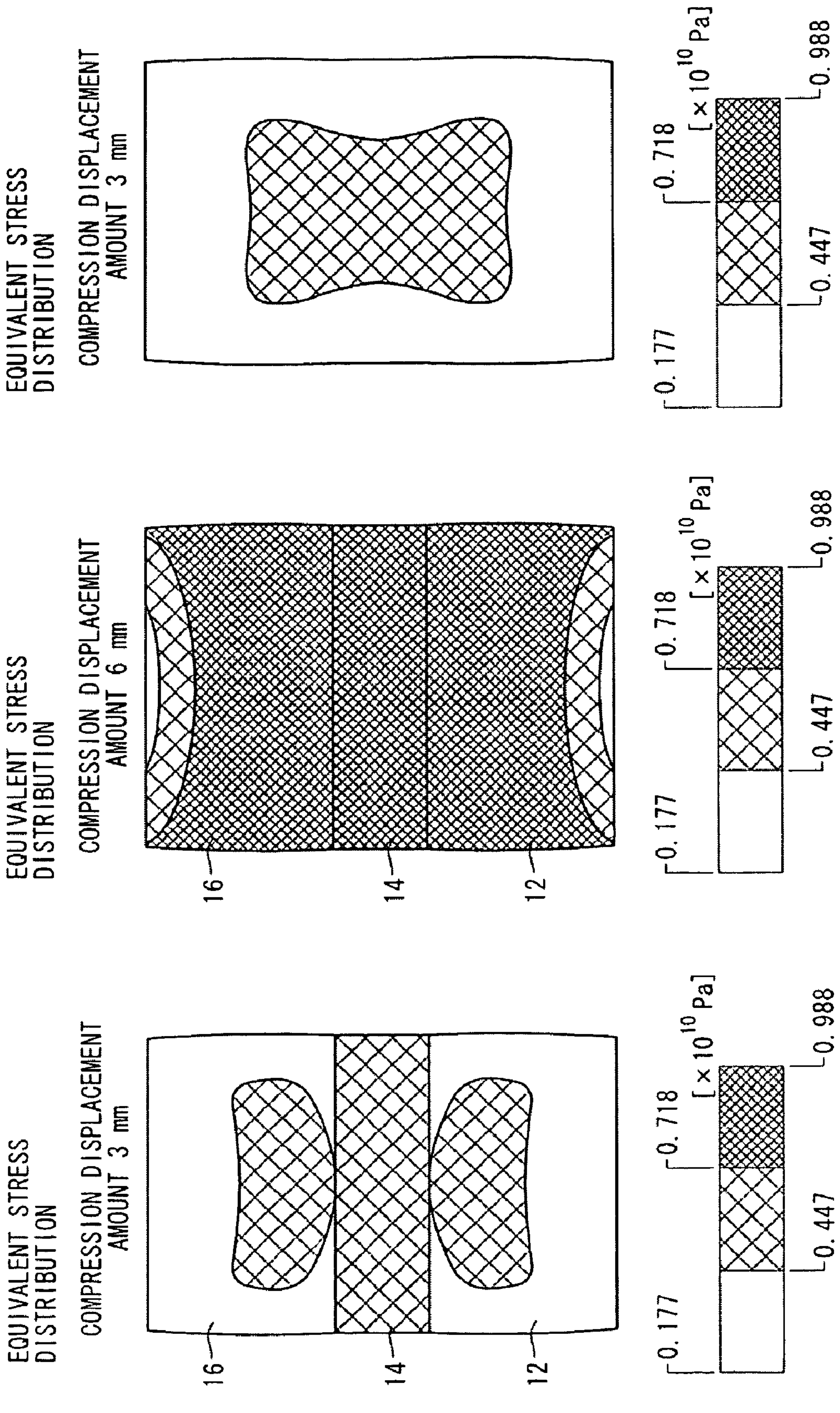
FIG. 4A is an explanatory diagram of the effect of a simulation indicating an equivalent stress distribution, in a cross section taken along line II-II of FIG. 2, in which a compression displacement amount is 3 mm.
FIG. 4B is an explanatory diagram of the effect of a simulation indicating an equivalent stress distribution, in a cross section taken along line II-II of FIG. 2, in which a compression displacement amount is 6 mm.
FIG. 4C is an explanatory diagram of the effect of a simulation indicating an equivalent stress distribution, in a cross section of a plate of the same thickness as the laminated structure of the present invention, in which a compression displacement amount is 3 mm.

FIGS. 4A and 4B are explanatory diagrams of the effects of a simulation indicating an equivalent stress distribution, in a cross section taken along line II-II of FIG. 2, for cases in which a compressive force is applied to the laminated structure 10 for a fluid, where FIG. 4A shows a case in which a Z-direction compression displacement amount is 3 mm, and FIG. 4B shows a case in which the Z-direction compression displacement amount is 6 mm. FIG. 4C is an explanatory diagram of the effects of a simulation indicating an equivalent stress distribution, in a cross section taken along the Z-direction, for a case in which the compression displacement amount in the Z-direction is 3 mm, wherein a plate has the same thickness as the laminated structure 10 and is formed by a JIS 6000-series alloy. In this case, the equivalent stress is represented by the mean square of the X-direction and the Y-direction.

With the simulation results shown in FIGS. 3A to 3C and FIGS. 4A to 4C, X-direction displacements and equivalent stresses are compared for cases in which the compressive force values are changed, using compressive force values at which diffusion bonding is achieved.

Concerning the displacement amount, focusing on displacements in the vicinity of the upper surface of the first block member 12 in which the grooves are formed, for a small displacement region, which is a region where the displacement amount is at or below $0.143\times10^{-3}$ (mm), in the case that the compression displacement amount is 3 mm, as shown in FIG. 3A, the small displacement region occupies about 50% in a widthwise direction. In the case that the compression displacement amount is 6 mm, as shown in FIG. 3B, the small displacement region occupies about 25% in the widthwise direction. In the case shown in FIG. 3C, in which the compression displacement amount also is 3 mm, the small displacement region occupies about 12% in the widthwise direction. As can be understood from FIGS. 3A and 3B, in laminated structures 10 for a fluid having the same three layered structure, in the case where the compression displacement amount is 3 mm, a small displacement amount region that is roughly two times greater can be obtained, compared to the case where the compression displacement amount is 6 mm. Further, as can be comprehended from FIGS. 3A and 3C, even when the compression displacement amounts are the same at 3 mm, in the laminated structure 10 for a fluid, a small displacement region can be obtained that is roughly four times greater than in a plate formed by a single material.

Further, concerning equivalent stress, focusing on displacements in the vicinity of the upper surface of the first block member 12 in which the grooves are formed, for a low stress region, which is a region where the equivalent stress is at or below $0.477\times10^{10}$ (Pa), in the case that the compression displacement amount is 3 mm as shown in FIG. 4A, the low stress region occupies about 90% in a widthwise direction. In the case that the compression displacement amount is 6 mm, as shown in FIG. 4B, in the widthwise direction, the low stress region does not exist at all, and the entire region is occupied by an equivalent stress of $0.718\times10^{10}$ (Pa) or greater. In the case shown in FIG. 4C, in which the compression displacement amount also is 3 mm, the low stress region occupies about 50% in the widthwise direction.

As can be understood from FIGS. 4A and 4B, in laminated structures 10 for a fluid having the same three layered structure, in the case where the compression displacement amount is 3 mm, a low stress region can be obtained. However, when the compression displacement amount is 6 mm, a low stress region cannot be obtained. Further, as can be comprehended from FIGS. 4A and 4C, even when the compression displacement amounts are both the same at 3 mm, in the laminated structure 10 for a fluid, a low stress region can be obtained that is roughly two times greater than in a plate formed by a single material.

Accordingly, in the laminated structure 10 for a fluid, when a material having a comparatively small elastic constant is selected for the first block member 12 and the second block member 16, that is, when the first block member 12 and the second block member 16 formed from a soft material are selected, whereas, on the other hand, a material having a comparatively large elastic constant is selected for the intermediate member 14, which is interposed between the first block member 12 and the second block member 16, that is, when a structure with a hard material stacked therein is selected, a reduction in the effects of the displacement amount and stresses between the intermediate member 14 and the first and second block members 12, 16 is made possible. As a result thereof, deformation of flow passages formed in the first block member 12 and the second block member 16 can be suppressed to a minimum, and a laminated structure 10 for a fluid, having flow passages therein that are both high in precision and excellent in durability can be obtained.

Figure 5:
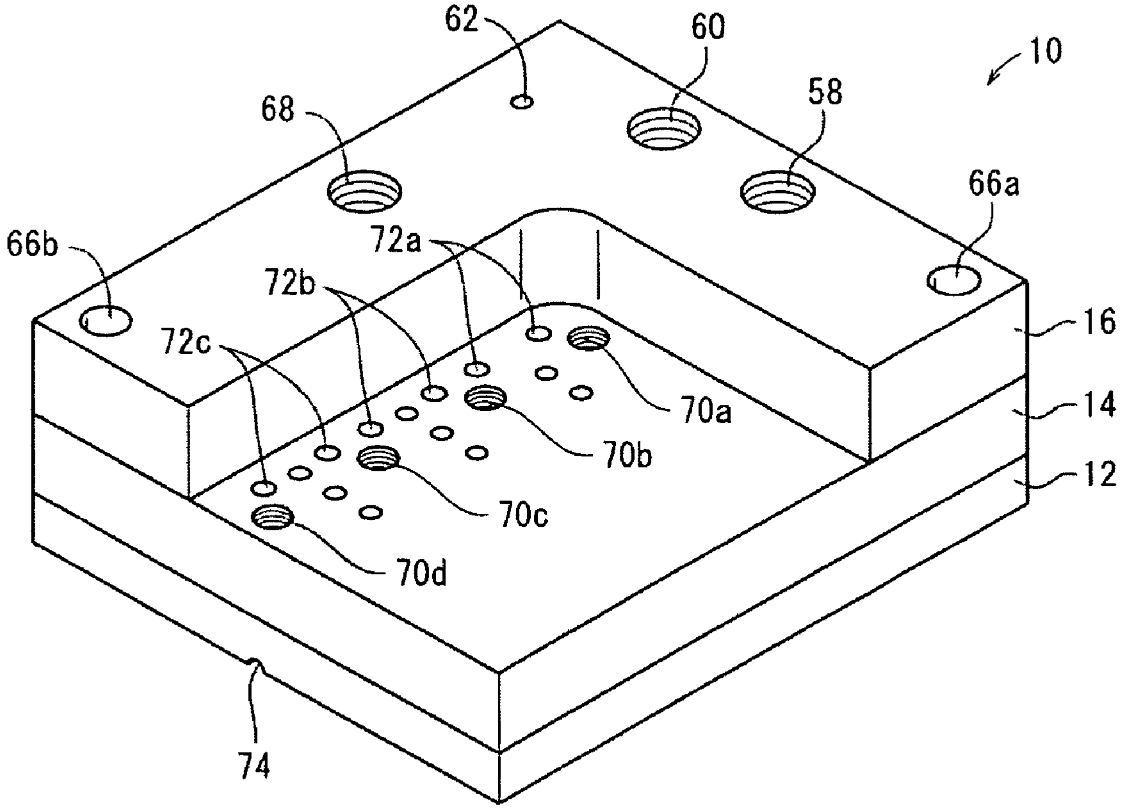
FIG. 5 is an outline perspective view of the laminated structure for a fluid, on which preprocessing is performed prior to having solenoid valves affixed thereto.
Figure 6A:
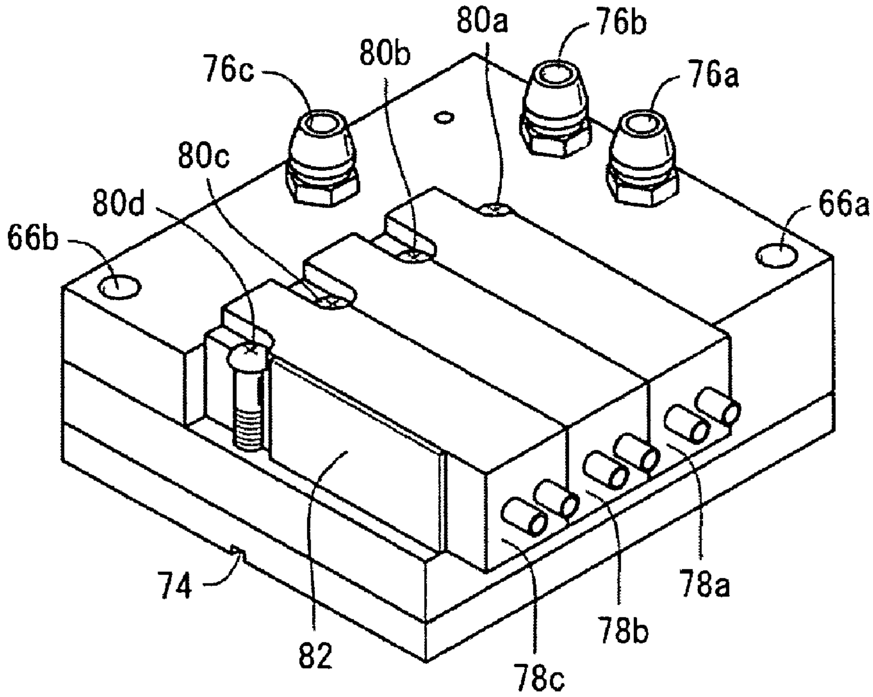
FIGS. 6A and 6B are outline perspective views of the laminated structure for a fluid having solenoid valves affixed thereto.
Figure 6B:
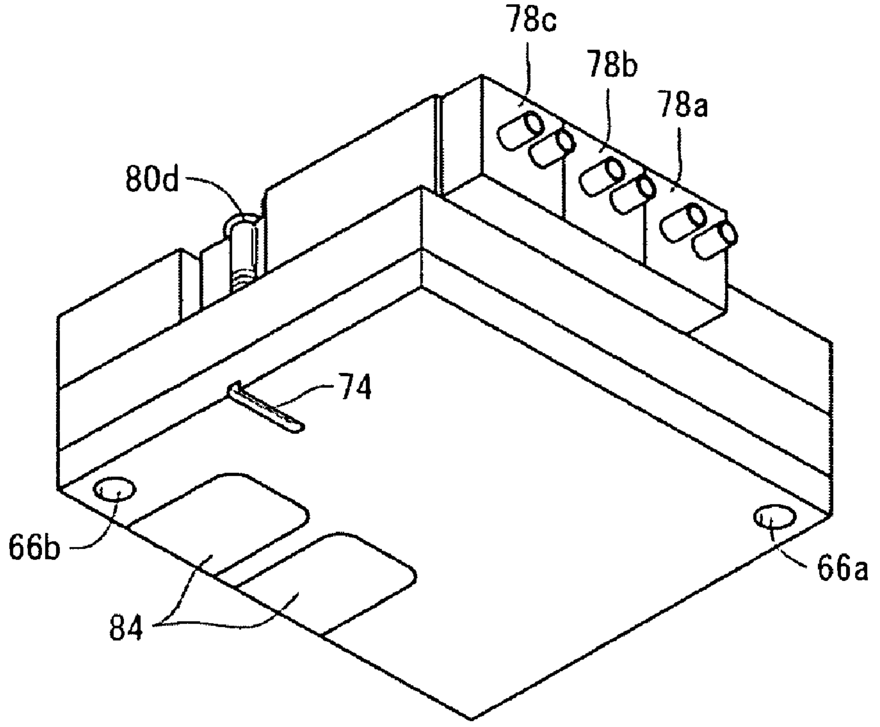

Next, a description shall be given concerning a process for a case in which, for example, solenoid valves are affixed to and utilized with the laminated structure 10 for a fluid. FIG. 5 is an outline perspective view of the laminated structure 10 for a fluid, on which preprocessing is performed prior to having solenoid valves affixed thereon, and FIGS. 6A and 6B are outline perspective views of the laminated structure 10 for a fluid with the solenoid valves affixed thereto.

With the laminated structure 10 for a fluid, first, as shown in FIG. 5, the second block member 16 is cut, so that a part of a corner portion becomes largely hollowed out. In succession, attachment holes 66*a*, 66*b* making up through holes are formed from the upper surface of the second block member 16, and together therewith, a through hole 68 is formed, which communicates with the groove 64 at the end part 64*b* thereof. Further, expanded diameter processing is carried out for the purpose of attaching connectors with respect to the inlet hole 58 and the outlet hole 60.

Next, screw holes 70*a* to 70*d* and attachment holes 72*a* to 72*c* are formed in the intermediate member 14 to enable fixing of the solenoid valves. In this case, a groove 74, which communicates with the discharge hole 26, is formed on a bottom surface of the first joint member 12 of the laminated structure 10, along with forming attachment holes (not shown) for mounting of sensors 84, which shall be described later.

Next, a connector 76*a* is mounted in the inlet hole 58, a connector 76*b* is mounted in the outlet hole 60, and a connector 76*c* is mounted in the through hole 68. In this case, a solenoid valve 78*a* is arranged at a position corresponding to the attachment holes 72*a*, a solenoid valve 78*b* is arranged at a position corresponding to the attachment holes 72*b*, and a solenoid valve 78*c* is arranged at a position corresponding to the attachment holes 72*c*. A screw 80*a* is threaded into the screw hole 70*a*, a screw 80*b* is threaded into the screw hole 70*b*, a screw 80*c* is threaded into the screw hole 70*c*, and a screw 80*d* is threaded into the screw hole 70*d*. In addition, a pressing plate 82 is disposed on a side surface portion of the solenoid valve 78*c*. In this manner, the solenoid valves 78*a* to 78*c* are affixed to the intermediate member 14. A solenoid-operated valve element (not shown) in the interior of the solenoid valve 78*a* is driven to open and close the through holes 42, 44, a solenoid-operated valve element (not shown) in the interior of the solenoid valve 78*b* is driven to open and close the through holes 46, 48, 50, and a solenoid-operated valve element (not shown) in the interior of the solenoid valve 78*c* is driven to open and close the through holes 52, 54, 56. Further, the sensors 84 are disposed on the bottom surface of the first block member 12 for detecting the flow amount and fluid pressure of the fluid that flows through the through holes 36 and 40.

In the laminated structure 10 for a fluid on which the solenoid valves 78*a* to 78*c* have been affixed, a fluid is inlet from the connector 76*a*, the valve elements (not shown) of the solenoid valves 78*a* to 78*c* are driven respectively, whereupon by opening and closing of the through holes, the fluid is outlet from the connector 76*b*.

As described above, the laminated structure 10 for a fluid according to the embodiment of the present invention comprises the first block member 12, the intermediate member 14 and the second block member 16, with these members being stacked in this order. In addition, by setting the elastic constant of the intermediate member 14 to be greater than the elastic constants of the first block member 12 and the second block member 16, deformation of the grooves 18, 20, 22, 24 formed in the first block member 12 can be minimized, and a laminated structure 10 for a fluid formed with high precision flow passages therein can be obtained.

Figure 7:
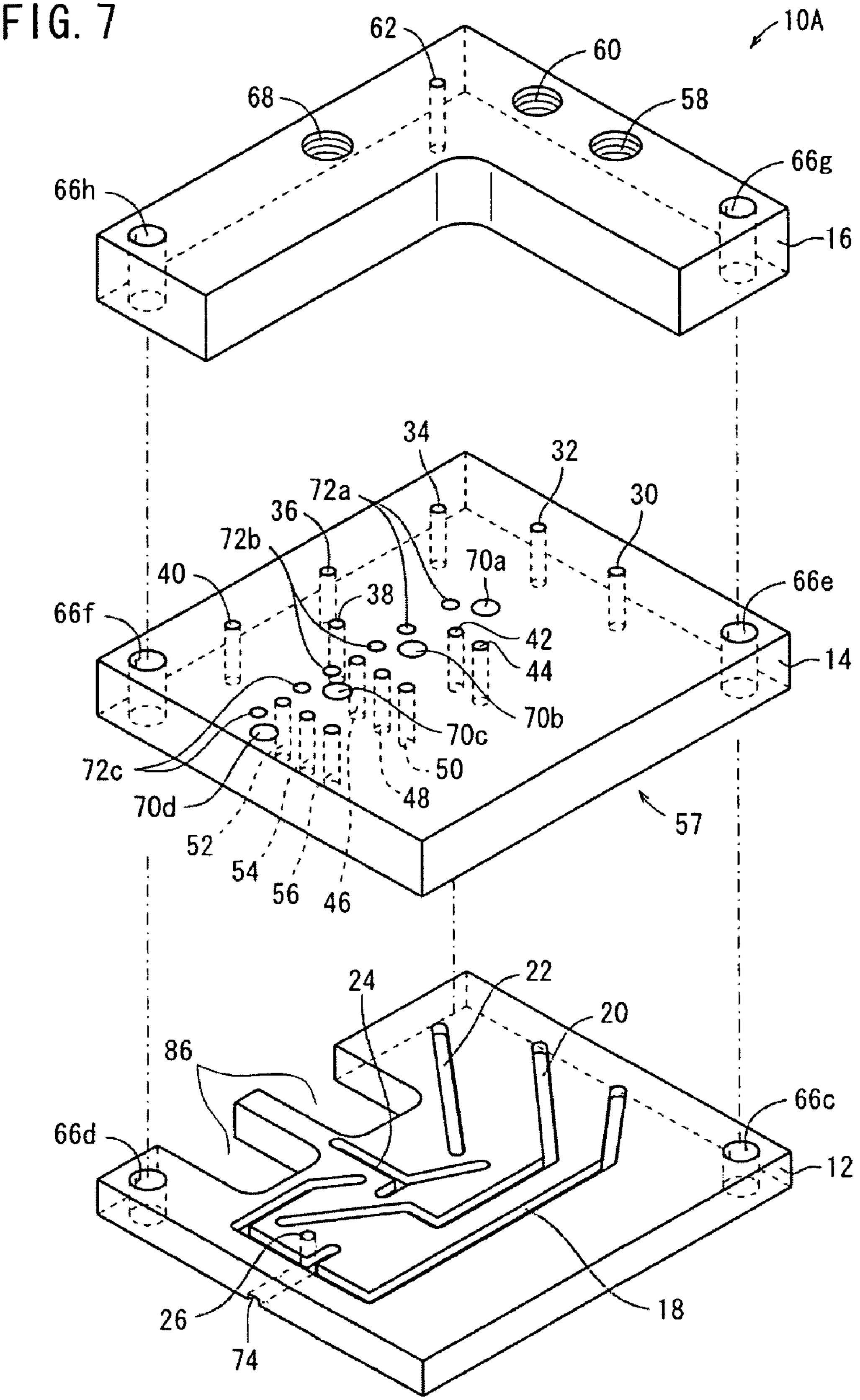
FIG. 7 is an exploded perspective view of a laminated structure for a fluid, which makes up a modified example of the embodiment of the present invention.

Next, a laminated structure 10A for a fluid according to a modified example of the embodiment of the present invention shall be described. FIG. 7 shows an exploded perspective view of the laminated structure 10A for a fluid, which is a modified example of the aforementioned laminated structure 10.

In the laminated structure 10 shown in FIGS. 5, 6A and 6B, although the attachment holes 66*a*, 66*b*, etc., are formed after the first block member 12, the intermediate member 14 and the second block member 16 have been diffusion bonded, so long as the first block member 12, the intermediate member 14 and the second block member 16 can be reliably diffusion bonded together, the laminated structure 10A for a fluid may also be formed by diffusion bonding after the attachment holes 66*a*, 66*b* have already been formed in the first block member 12, the intermediate member 14, and the second block member 16. More specifically, the grooves 18, 20, 24, the discharge hole 26, the attachment holes 66*c*, 66*d*, and the attachment openings 86 for mounting of the sensors 84 therein are formed in the first block member 12, and additionally, the groove 74 is formed on the bottom surface thereof. Next, the through holes, the attachment holes 66*e*, 66*f*, the screw holes 70*a* to 70*d* and the attachment holes 72*a* to 72*c* are formed in the intermediate member 14. Further, the inlet hole 58, the outlet hole 60, the exhaust hole 62, the attachment holes 66*g*, 66*h*, and the through hole 68 are formed in the second block member 16. Then, the laminated structure 10A for a fluid may be formed by stacking the first block member 12, the intermediate member 14 and the second block member 16 in this order, and diffusion bonding the members together.

Moreover, with the above-mentioned laminated structure 10 for a fluid, a three layered structure made up of three members was provided. However, the present invention is not limited to this configuration. For example, the laminated structure may be formed from two members made up of either the first block member 12 or the second block member 16, together with the intermediate member 14. Further, the laminated structure may also comprise a multilayered structure made up of four or more members.

Furthermore, each of the members of the above-mentioned laminated structure 10 for a fluid are joined mutually together by diffusion bonding. However, the present invention is not limited to this bonding method. For example, the members may also be joined by a welding method such as pressure welding, pressure bonding or the like.

The present invention is not limited to the aforementioned embodiments. It is a matter of course that various other structures and configurations may be adopted without deviating from the essential features and gist of the present invention.

What is claimed is:

1. A laminated structure for a fluid comprising:

three block members made up of a first block member, an intermediate member, and a second block member, wherein the first block member, the intermediate member, and the second block member are stacked together in this order to form the laminated structure, and are joined mutually such that the intermediate member contacts the first and second block members, and further wherein the elastic constant of the intermediate member is set to be greater than the elastic constants of the first block member and the second block member; and a solenoid valve affixed to the intermediate member, wherein the second block defines at least one inlet orifice for inserting fluid inside the laminated structure via the inlet orifice, the inlet orifice being in fluid communication with a hole defined through the intermediate member, the hole being in fluid communication with a groove defined in the first block such that a fluid flow passage is formed between the first and second block members.

2. The laminated structure for a fluid according to claim 1, wherein the three block members are welded to each other.

3. The laminated structure for a fluid according to claim 1, wherein the three block members are diffusion bonded to each other.

4. The laminated structure for a fluid according to claim 1, wherein the first and second block members are made from an aluminum-magnesium-silicon based alloy.

5. The laminated structure for a fluid according to claim 1, wherein the intermediate member is made from an aluminum-copper-magnesium based alloy.

6. The laminated structure for a fluid according to claim 1, wherein the first and second block members are made of a same material.

7. The laminated structure for a fluid according to claim 1, wherein the first and second block members are made of a first aluminum alloy, and the intermediate member is made of a second aluminum alloy.

8. The laminated structure for a fluid according to claim 7, wherein the first and second block members are made from an aluminum-magnesium-silicon based alloy, and the intermediate member is made from an aluminum-copper-magnesium based alloy.

9. The laminated structure for a fluid according to claim 1, wherein the hole in the intermediate member has a constant cross section from the inlet orifice of the second block member to the groove of the first block member.

10. The laminated structure for a fluid according to claim 1, wherein the hole in the intermediate member is cylindrical with a circular cross-section.

11. The laminated structure for a fluid according to claim 1, wherein the groove defined in the first block is a three-pronged groove that includes three end parts that respectively communicate with three distinct through holes in the intermediate member.

12. The laminated structure for a fluid according to claim 11, further comprising a sensor disposed on a bottom surface of the second block that detects a flow amount of a fluid that flows through one of the three distinct through holes in the intermediate member.

13. The laminated structure for a fluid according to claim 11, further comprising a sensor disposed on a bottom surface of the second block that detects a fluid pressure of a fluid that flows through one of the three distinct through holes in the intermediate member.

14. A laminated structure for a fluid comprising:

a first block member;

an intermediate member;

a second block member; and a solenoid valve, wherein the first block member, the intermediate member, and the second block member are stacked together in this order to form the laminated structure, and are joined mutually such that the intermediate member directly contacts the first and second block members, wherein the elastic constant of the intermediate member is set to be greater than the elastic constants of the first block member and the second block member, and wherein the solenoid valve is directly affixed to the intermediate member.

* * * * *